Patented Nov. 25, 1941

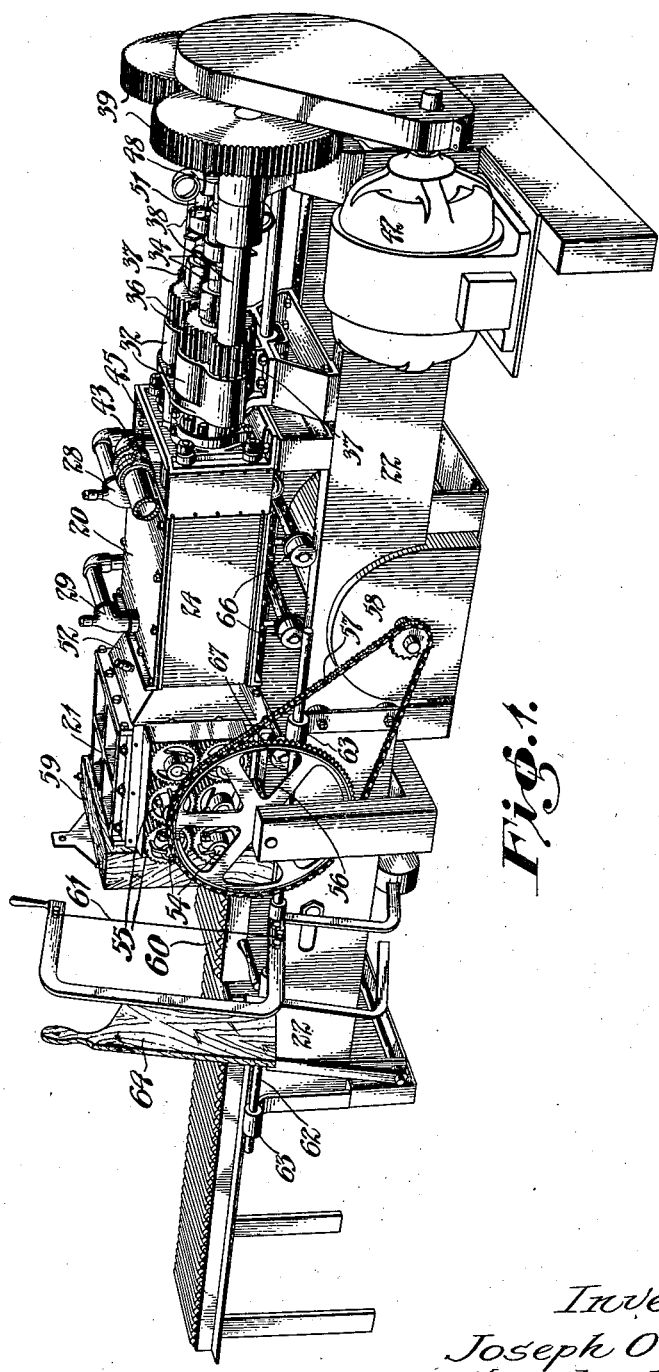

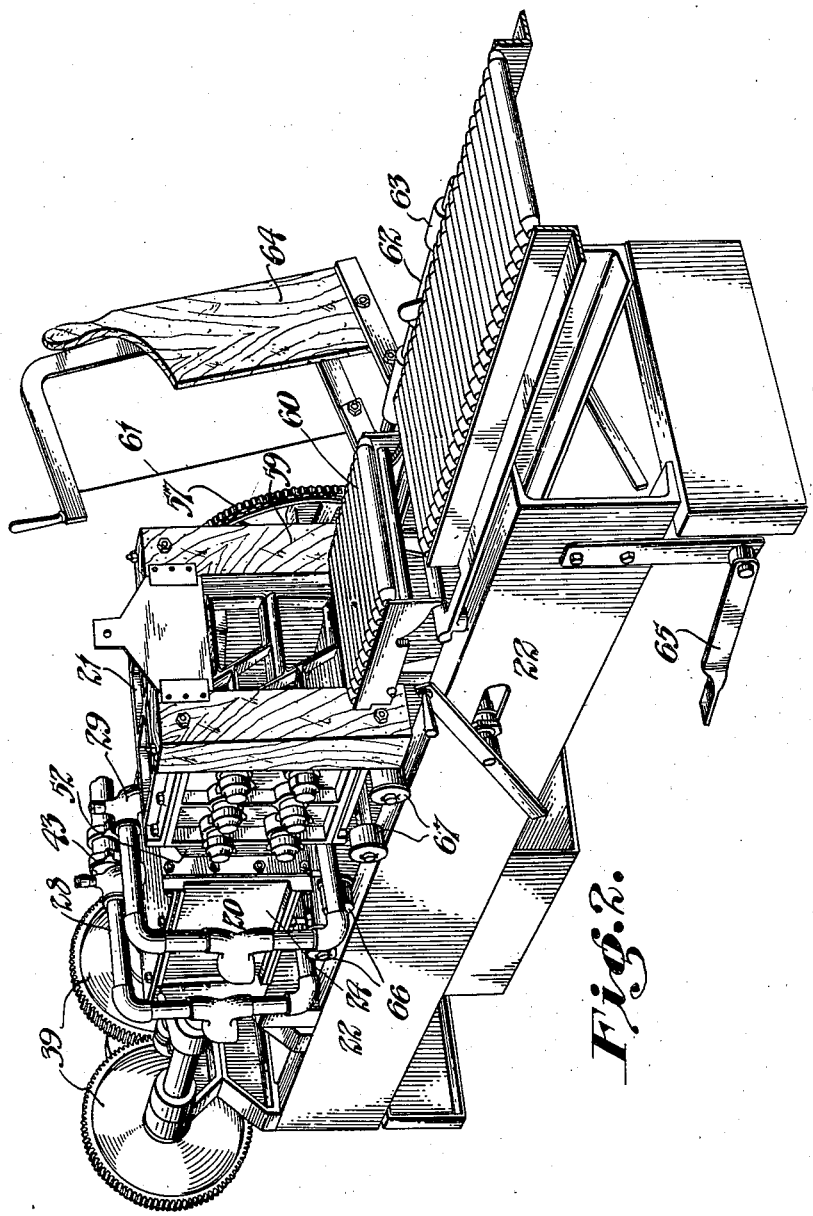

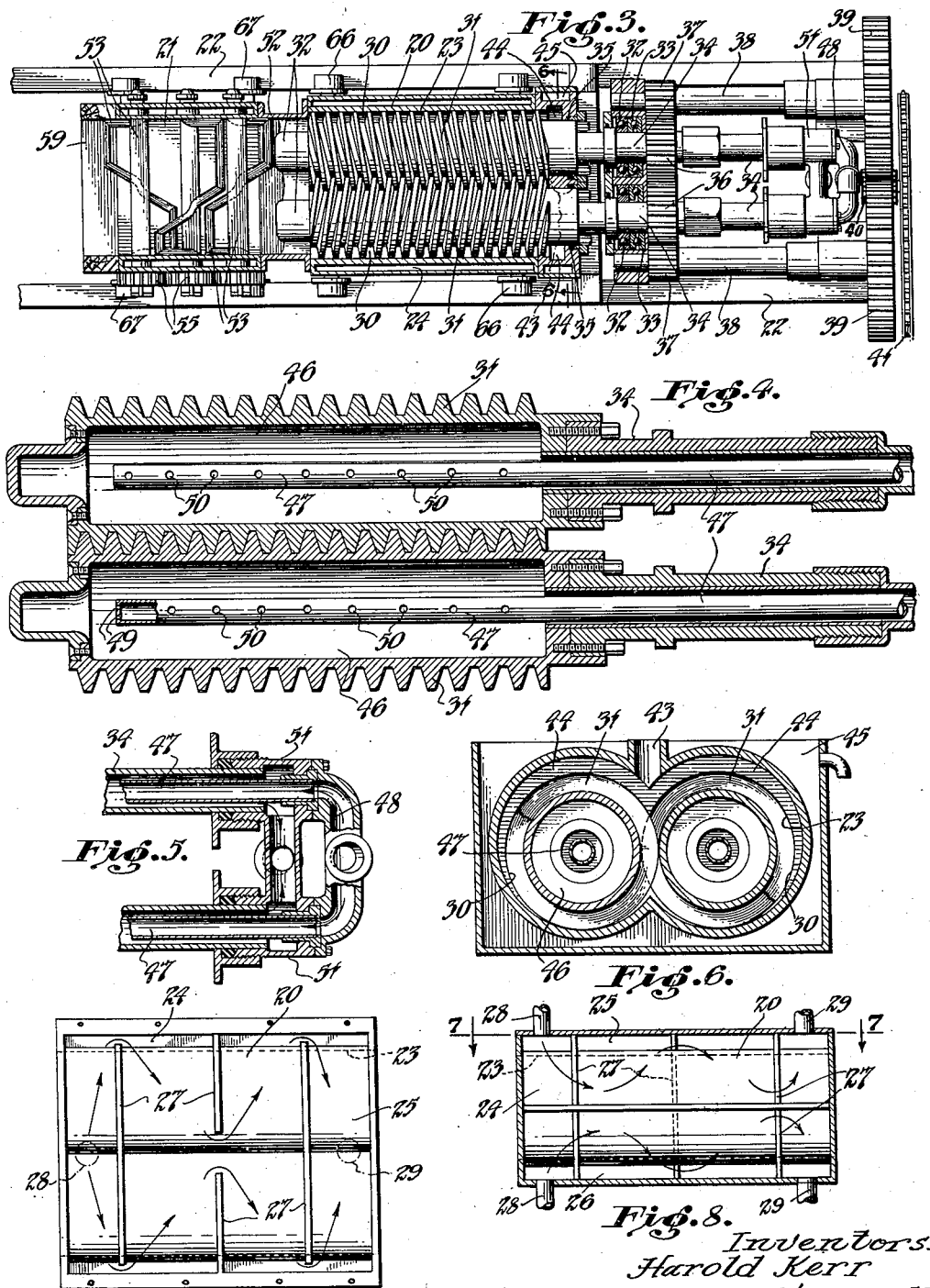

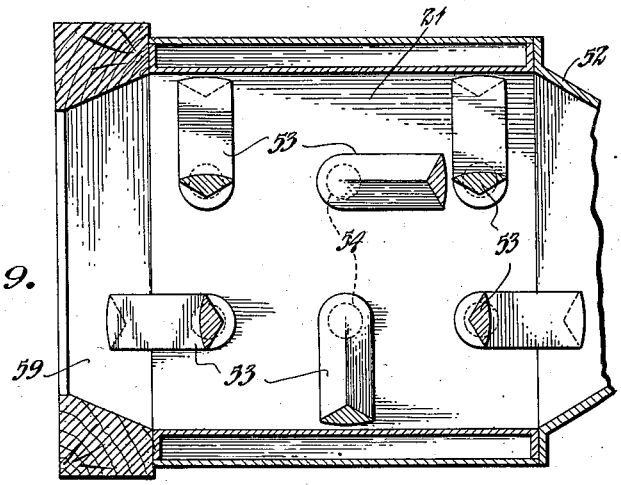
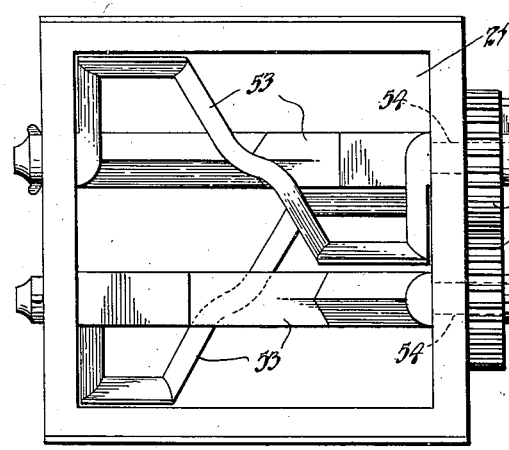
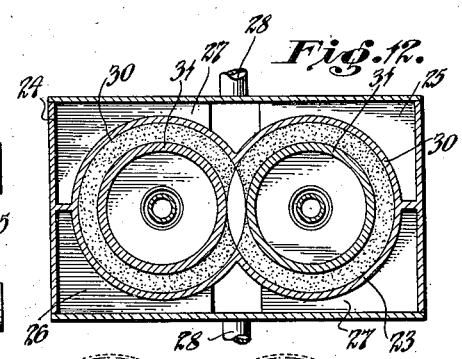
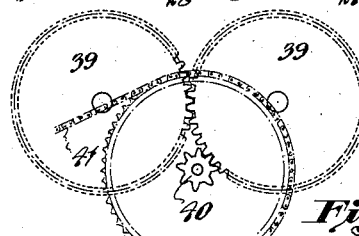
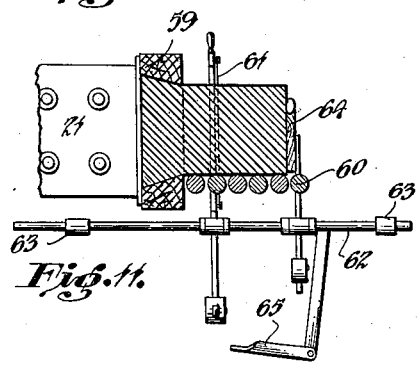
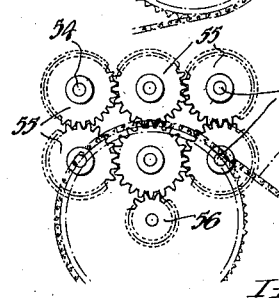

2,263,851

UNITED STATES PATENT OFFICE 2,263,851

APPARATUS FOR TREATING SUBSTANCES BY SUDDEN CHILLING AND/OR THE CONTINUOUS WORKING THEREOF

Joseph O'Connell and Harold Kerr, Macaulay Road, Kensington, Victoria, Australia Application April 28, 1938, Serial No. 204,769
In Australia May 11, 1937

12 Claims. (Cl. 31—20)

This invention has reference to an apparatus for treating substances by sudden chilling and/or working thereof while maintaining a continuity of operation. The said invention has been devised to provide a means comparatively cheap to manufacture and positive in its operation, and is particularly adaptable for treating cream having a fat content equal to or more than the standard fat content of butter. Its use however is not limited thereto as various substances, for example, edible fats and edible oils in emulsion, ice cream mixes, normally churned butter, soaps and like types of substances may be treated where it is desired to produce either a solid moulded product from a prepared substance in liquid or semi-liquid form within a very short period of time or to produce a thoroughly worked product in moulded form and in a continuous operation. Some substances require both treatments of sudden chilling and continuous working and other substances require one only of such treatments.

Hitherto it has been the accepted practice in the manufacture of butter to subject treated cream having a fat content of approximately 30% to 40% to a churning operation prior to working the butter in a batch within the churn which usually has working elements therein. After such working operation the butter is removed to permit same being packed into boxes or being moulded into blocks of predetermined size, the churning, working and associated operations requiring a considerable amount of apparatus. Besides this fact a great amount of time is expended in carrying out the said operations due mainly to the necessity of having to both churn and work the butter in batches.

The main object of the present invention is to provide apparatus for treating substances by chilling and for the continuous working thereof for carrying such method into effect whereby the said substance which may be in a liquid or semi-liquid form is suddenly chilled during its continuous travel through the apparatus and then moulded into a desired configuration. Alternately the substance after being suddenly chilled may be forced through continuous working elements prior to the said substance being discharged in a moulded form, all without affecting the continuity of operation.

With the above object in view, the present invention consists in conveying the substance in layer or comparatively small cross-sectional form through the apparatus by co-acting extruder elements rotatably disposed within a jacketed chamber carrying a circulating cooling medium such as brine. The said extruder elements are in the form of driven co-acting screws disposed in parallel relationship each being hollow so as to also have internally circulated therein a cooling medium. This latter imparts a low temperature to as much as possible of the substance being conveyed by the extruder elements to effect a sudden chilling to a desired degree of said substance prior to it being discharged through a mould. This mould may be disposed at the exit of the extruder section or, in the case where the substance being treated requires a working operation, at the exit of a continuous working section. The said working section is adapted to receive and have forced through it by the extruder elements the chilled unworked product, without affecting the continuity of operation. The said working section is jacketed for a circulating cooling medium in order to retain at a predetermined temperature the substance passing through the working elements. Means such as a roller conveyor is provided at the discharge end for receiving the final product whilst adjustable means are also provided for cutting the product into predetermined sizes preferably rectangular during its travel along the conveyor.

As some substances require no working operation and others no sudden chilling, it will be understood that either the extruder or working section may be used independently of the other. For example, when the substance to be treated does not require to be passed through the working section, the extruder section is provided with a mould at its discharge end in order to obtain a chilled product of a desired form. On the other hand when it is desired to subject a substance to a continuous working operation only, such as normally churned butter, the said working section is provided with means for feeding the substance thereinto and as well a mould at its discharge end in order to obtain a properly worked butter in a desired form whilst maintaining a continuity of operation.

For the purpose of describing our invention, we will refer, for example, to its use in the treatment of a warm cream having a fat content equal to or more than the standard fat content of butter.

The invention is characterized by a continuous apparatus for chilling, working and moulding substances, and where the substance is a cream having a fat content equal to or more than the standard fat content of butter, the sudden chilling action changes the substance from the physical state of cream into the physical state of a partly churned butter which, when passed through the working section, produces a thoroughly worked butter. The final stage of the process is the discharge of the worked butter through a mould of desired configuration prior to said butter being cut at right angles into predetermined sizes during its continuous discharge. In other words the process amounts to a new way of making butter wherein the feature of sudden chilling in lieu of churning coupled with the continuity of operation from the point where the cream enters until the discharge of a properly worked butter ready for packing is a significant advance in the art.

An important feature embodied in our invention is apparatus for introducing a liquid or semi-liquid substance at a predetermined temperature into an extruder section adapted to suddenly chill the substance during its continuous travel therethrough and prior to being discharged at a predetermined temperature through a mould of desired configuration.

Another important feature embodied in our invention is the provision of a continuous working section, preferably brine cooled, and associated with the extruder section, whereby the substance is continuously forced by the elements of the extruder section through working elements of the working section, to effect the proper and correct working of the substance prior to it being continuously discharged at a predetermined temperature through a mould of desired configuration.

A further important feature in the invention is the utilization of a pair of co-acting extruder elements rotatably disposed in parallel relationship within a clearance fitting chamber jacketed to receive a circulating cooling medium. Each of the elements is made hollow for also receiving a circulating cooling medium for the purpose of lowering to a desired degree the temperature of the substance being conveyed by said elements. Suitable gearing is employed for driving both elements in order to avoid friction between the faces of the co-acting or effective portions of said elements.

The following is an example of a test carried out with an experimental machine, it being understood that the temperature and times stated are only approximate and may vary to suit requirements.

*Example*

A quantity of cream having a fat content of approximately 40% was firstly pasteurized to 190° F. and then cooled to 145° F. At this temperature it entered and was discharged from a separator so as to produce a cream having a fat content of 80%. The cream was then salted prior to entering a standardising and storage vessel in which it was subject to a 25- to 27-inch vacuum. The cream was then allowed to remain in said vessel under the vacuum for approximately thirty minutes after separating, the said cream being continuously agitated in order to obtain a uniform and standard composition.

The heating water in the jacket of the vessel (which water was maintained at a temperature of 145° F.) was then gradually reduced in temperature to about 80° F., such reduction taking approximately thirty minutes.

The cream having a temperature of approximately 80° F. was then discharged from the vessel into the extruder section carrying the extruder elements, both the casing and the elements having a circulating cooling medium passing therethrough so as to subject the cream to a sudden chilling, which sudden chilling had the effect of changing the substance from the physical state of cream into the physical state of a partly churned butter.

The temperature of the unworked butter at the discharge end of the extruder was 32° F. prior to said butter being forced by the extruder elements through a jacketed working section. The latter was provided with a mould at its discharge end so as to obtain a properly worked butter in a desired form, a continuity of operation being maintained from the time the cream entered the extruder section until the discharge of the properly worked butter.

In order to maintain the temperature of the product whilst passing through the working section, the said section was brine cooled. However it is not essential that such temperature should be maintained as the final product may be discharged at a slightly higher temperature than the temperature at which it enters the working section.

The temperature of the brine entering the extruder elements and extruder casing was approximately 6° F., which was found sufficient to suddenly chill the substance so as to bring about the physical change above referred to and to cause the unworked product to enter the working section at 32° F.

Other features of this invention are described hereinafter with reference to the accompanying drawings in which—

Figures 1 and 2 are perspective views of the apparatus having associated extruder and working sections.

Figure 3 is a plan view of the extruder and working sections and associated extruder drive, the cooling jacket and shaft bearings being shown in section.

Figure 4 is a plan view in section of the extruder elements showing therein the means for circulating the cooling medium therein.

Figure 5 is a detail section of the manifold for supplying and discharging the cooling medium to and from the extruder section cooling jacket.

Figure 6 is a sectional view taken on line 6—6 of Figure 3.

Figure 7 is a view taken along the line 7—7 of Figure 8.

Figure 8 is a view in side elevation of the extruder section with the cooling jacket in section.

Figure 9 is an elevation in section of the working section, and

Figure 10 is an end view thereof.

Figure 11 is a detail view of the moulding, cutting and delivery portion of the apparatus.

Figure 12 is a sectional view of the extruder section from the discharge end;

Figure 13 is a detail view of the extruder section gearing; and

Figure 14 is a detail view of the working section gearing.

According to one form of carrying our invention into practical effect, we will describe an apparatus combining an extruder section 20 and a working section 21 for the purpose of treating a warm cream having a fat content equal to or more than the standard fat content of butter. The apparatus comprises a framework or bedplate 22 for supporting an extruder section 20, a working section 21 and associated driving and operating mechanism.

The extruder section 20 which is one of the important parts of the apparatus comprises a chamber 23 jacketed to receive a circulating cooling medium such as brine. The said jacket 24 forming two independent compartments 25 and 26, one 25 serving the top half and one 26 serving the bottom half of the chamber 23. Each of the compartments 25 and 26 has baffle plates 27 disposed therein so as to cause the cooling medium to uniformly and efficiently circulate therein, inlets 28 and outlets 29 being provided for the purpose.

The interior 23 of the extruder 20 is provided with longitudinal and parallel adjacent recesses 30 merging into one another so as to receive a pair of co-acting screws 31 forming the extruder elements. The recesses 30 are so shaped as to leave a minimum amount of clearance between the interior of the chamber wall and the periphery of the co-acting screws 31 so that any substance passing through the recesses 30 is conveyed in horse-shoe-like rings from one thread of each co-acting screw 31 to the adjacent thread of the same screw until the said substance is discharged from said extruder elements 31 the thread of which may be of any desired shape. The pitch and the number of starts of said screws depends on requirements and capacity of the apparatus.

Each of the co-acting extruder elements 31 is rotatably disposed in bearings 32, thrust bearings 33 being also provided. The axial shafts 34 of said elements 31 extend through respective packing glands 35 and have meshing gear wheels 36 mounted thereon, each gear wheel 36 being driven by separate pinions 37 mounted on respective shafts 38 in turn driven by gear wheels 39 meshing with a common pinion 40 driven by a chain drive 41 from an electric motor 42. The feature of the gearing described is to obtain a large speed reduction and to ensure that each extruder element 31 is driven so that no friction will take place between the inter-engaging portions of said co-acting extruder elements 31.

At the driving end of the extruder chamber 23 we provide an inlet 43 through which the substance to be treated passes. This entry 43 is disposed centrally over and between the two extruder elements 31 but at this point the said elements 31 are devoid of any thread which assists the flow of the substance to the entry of said threads. In order to further assist the entry of the substance into the threads, eccentric clearance recesses 44 are provided, the bottom of each recess 44 being flush with its adjacent recess 30 in the extruder chamber 23 to prevent the lodgment of liquid during cleaning operations.

To safeguard against the chilling of the substance prior to its entry into the threads of the extruder elements 31, an independent jacket 45 is provided adjacent the point of entry and around the chamber 23 through which jacket 45 warm water may be circulated, but this jacket 45 may be dispensed with if found unnecessary.

Each of the extruder elements 31 is of a hollow construction so as to form a recess 46 through which a cooling medium is circulated in order to impart a low temperature to as much as possible of the substance being conveyed through the chamber 23 by the extruder elements 31. In order to ensure that a proper and efficient circulation will take place we provide within each extruder element a tube 47 which passes from an exteriorly positioned brine inlet manifold 48 through the shaft 34 of the element 31 into the hollow recess 46, the said tube 47 terminating a predetermined distance from the blind end of the recess 46. So as to prevent any air locks or stagnant zones within the recess 46 of the extruder element 31, the end of the tube 47 is plugged and provided with comparatively small openings 49. The tube 47 is also perforated with a series of openings 50 along its periphery and through which the cooling medium is discharged in the form of jets or sprays. The said cooling medium returns along and around the outside of the inlet tube 47 to a discharge chamber 51 surrounding the inlet manifolds 48.

The circuits of the circulating cooling medium through the extruder elements 31 and the extruder chamber 23 may be arranged as desired, namely in series or in parallel or a separate pump (not shown) may be used for each circuit, the essential feature being to efficiently circulate the cooling medium through both circuits so as to impart the required low temperature to the substance whilst being conveyed through the extruder chamber 23 in order to achieve the desired result.

Adjacent the discharge end of the extruder section 20 and in alignment therewith is the detachable working section 21 in the form of a chamber into and through which the chilled substance is forced by the extruder elements 31 due to their conveying action. A mouth piece 52 is provided for coupling the two sections 20 and 21 together and for directing the chilled product into contact with a plurality of rotatably disposed working elements 53 of desired configuration within the said working section 21. The shafts 54 of said elements 53 pass through the wall of the working section 21 for the purpose of being geared to one another by means of gear wheels 55 in order that each element 53 is made to rotate in the opposite direction to its adjacent element, all elements 53 being rotated in unison by a pinion 56 driven by a chain drive 57 from an electric motor 58.

As before stated the working elements 53 may be of any desired configuration but are preferably of such a shape that the complete area of the chamber 21 is covered so as to avoid any of the substance passing therethrough without being thoroughly and properly worked.

The working chamber 21 is preferably jacketed to receive a circulating cooling medium for the purpose of maintaining the substance at approximately the same temperature whilst passing therethrough although the said substance may be discharged at a slightly higher temperature without detrimental effects thereto.

Disposed at the discharge end of the working section 21 and in alignment therewith is a mould 59 of desired shape and through which the finished product is discharged on to a platform or roller conveyor 60, cutting means 61 being provided for forming the product into blocks of predetermined sizes. As the cutting operation takes place during the continuous discharge of the product the cutting device 61 must move in unison with the product otherwise an angular cut could not be avoided and to meet these requirements we provide a shaft 62 slidable in bearings 63 mounted on one side of the framework 22, the said shaft 62 carrying a freely movable cutting device 61 and an associated stop 64 also freely movable on said shaft 62. Both the cutting device 61 and the stop 64 are adjustable on and adapted to move longitudinally in unison with said shaft 62.

The stop 64 when in operative position is disposed horizontally in the path of travel of the discharging product and when the said product registers with said stop 64 the same is moved forwardly and in doing so causes the cutting device 61 to move longitudinally in unison therewith and consequently at the same speed as the continuous discharging product enabling the operator to carry out the cutting operation and obtain a right angular cut. After said cut the cutting device 61 and the stop 64 are returned to their normal positions by the manipulation of a foot-pedal 65, which, through levers, returns the slidable shaft 62 to its starting or normal position.

So as facilitate the cleaning of the extruder section 20, the jacketed extruder chamber 23 is provided with wheels or rollers 66 where said chamber 23 is supported on the main framework 22. The working section 21 is also provided with similar rollers 67 enabling both portions 23 and 21 to be moved longitudinally and clear of the extruder elements 31. Flexible connecting pipes (not shown) are employed on the brine inlets and outlets to avoid having to uncouple same, it being necessary in the design illustrated to remove the chain 57 from the working section driving motor 58.

It will be understood that suitable packing glands, gaskets and other requirements are incorporated where necessary according to standard engineering practice. While we have described an extruder section associated with a working section it will be understood that either section may be used independently of the other depending on the substance being treated. But in the case where butter or the like type of product is to be produced both sections are necessary and by the use of same a continuity of operation is obtained from the entry of the cream into the extruder section until a properly worked butter is discharged through the continuous worker section.

Any type of extruder elements may be employed that will convey and permit to be chilled the product passing through the extruder section, while various forms of working elements may be employed in the continuous working section, which elements may be in the form of fluted rollers, staggered co-acting cams or like efficient means of working.

The operation of the apparatus for continuously producing a thoroughly worked butter without churning is as follows.

The apparatus is set in operation and a low temperature cooling medium circulated through the jacketed portions 24 of machine.

Cream having a fat content equal to or more than the standard fat content of butter, which cream has been standardized and reduced in temperature but is capable of flowing, is then fed into the extruder section 20 where the cream is suddenly chilled which results in the cream being changed from the physical state of cream into the physical state of a partly churned butter. The substance is conveyed through the extruder section 20 by the co-acting extruder elements 31 in horse-shoe like segments due to the construction of said co-acting elements 31 and discharged into the working section 21 through which the chilled product is forced during its continuous working, the worked butter continuously discharging through a mould 59 of desired configuration prior to being cut into predetermined blocks or quantities.

In order to avoid air being mixed with the first lot of butter discharged an air-tight plate is placed over the discharge opening and the air is withdrawn from the apparatus. As the butter reaches the discharge opening the plate is removed, further air being prevented from entering the apparatus in view of the entire area being taken up by the butter.

We claim:

1. Apparatus for manufacturing butter in a continuous operation from warm cream having a fat content equal to or more than the standard fat content of butter characterized by an extruder section and an adjacent continuous working section, means for receiving a cooling medium for the purpose of suddenly chilling the cream after having been fed into the extruder section, means within the extruder section for conveying the chilled product into the working section and forcing said product through said working section, and means within the working section to work the product into a properly worked butter.

2. Apparatus for manufacturing butter in a continuous operation according to claim 1 and wherein the extruder section comprises a brine jacketed chamber recessed to receive with a minimum clearance conveying means, and wherein the conveying means comprises independently driven conveyor elements, the said elements being hollow to receive a circulating cooling medium.

3. Apparatus for manufacturing butter in a continuous operation according to claim 1 and wherein the working section comprises a brine jacketed chamber and the working and discharge means comprises a plurality of elements driven in unison.

4. Apparatus for manufacturing butter in a continuous operation from warm cream having a fat content equal to or more than the standard fat content of butter characterized by an extruder section, an adjacent continuous working section, means for admitting cream into said extruder section, and means for suddenly chilling the cream in said extruder section, said last-named means including a chamber surrounding said extruder section, a pair of hollow extruder elements within said extruder section, and means for admitting a cooling medium into said hollow extruder elements and said chamber.

5. Apparatus for manufacturing butter in a continuous operation from warm cream having a fat content equal to or more than the standard fat content of butter characterized by an extruder section and an adjacent working section, co-acting extruder elements within the extruder section, means for admitting the cream into contact with said co-acting extruder elements, cooling means associated with said elements and extruder section for shock-chilling the cream sufficiently to change its state from the physical state of cream into the physical state of a partly churned butter, and a plurality of working elements in said working section, the said co-acting elements being adapted to convey the chilled product through the extruder section and to force said product through said working section into contact with said working elements within the working section, where the product is worked into a finished butter.

6. Apparatus for treating substances of the type herein specified characterized by an extruder section and an adjacent working section, means for shock-chilling the substance after having been fed into the extruder section, means within the extruder section for conveying, without friction between conveying elements, the chilled product into the working section and for forcing said product through said working section, and means within the working section for thoroughly working the product.

7. Apparatus for manufacturing butter in a continuous operation from warm cream having a fat content equal to or more than the standard fat content of butter comprising an extruder section, a jacketed chamber surrounding said extruder section, a pair of hollow co-acting elements located within said extruder section, means for admitting cream to be treated into said extruder section, and means for admitting a cooling medium into said chamber and said hollow elements whereby said cream in said extruder section is shock-chilled.

8. Apparatus for manufacturing butter in a continuous operation from warm cream having a fat content equal to or more than the standard fat content of butter comprising an extruder section, a working section, a jacketed chamber surrounding said extruder section, a pair of hollow co-acting threaded elements within said extruder section, said elements being geared together exteriorly of said extruder section and adapted to rotate in opposite directions, means for admitting cream into said extruder section, means for delivering said cream from said extruder section to said working section, and means for admitting a cooling medium into said chamber and said hollow elements whereby said cream is shock-chilled before leaving said extruder section.

9. Apparatus for treating substances comprising an extruder section, a jacketed chamber surrounding said extruder section, means for admitting the substance to be treated into said extruder section, a pair of hollow co-acting threaded elements located within said extruder section, said elements being geared exteriorly of said extruder section, whereby said elements rotate in opposite directions and in unison without frictional contact between engaging portions of said elements to convey the substance being treated from one end of the extruder section to the other, means for admitting a cooling medium into said chamber and said hollow elements to shock-chill said substance while passing through said extruder section, said hollow elements having a portion devoid of threads and an eccentric recess adjacent to said non-threaded portion of said elements, whereby said substance is assisted in entering the threads of said hollow elements.

10. Apparatus for treating substances of the type herein specified comprising a bed plate or frame having slidably positioned thereon an extruder section and an associated working section, the extruder section comprising conveying elements disposed within a jacketed chamber, said elements being supported and driven exteriorly of said chamber, the said working section comprising a chamber detachably connected to the said extruder chamber and having rotary working elements located therein, the extruder chamber being detachably connected to an end plate fixed and supported on the bed plate to enable the extruder chamber to be moved clear of the conveying elements, and the working chamber clear of the said extruder chamber for the purpose of cleaning the parts thereof.

11. Apparatus for treating substances of the type herein specified comprising a bed plate or frame having slidably disposed thereon an extruder section and an associated working section, the extruder section comprising a jacketed chamber having hollow conveying members positioned therein, the jacket of said chamber and the said members being adapted to have a cooling medium circulating therethrough and with said members being supported and geared together exteriorly of the chamber to enable same to rotate in unison in opposite directions, an opening in one end of the said chamber to permit the substance to be treated to pass into the chamber and be conveyed therethrough and discharged by the said conveying members into the working section which comprises a chamber having located therein rotating working members geared together exteriorly of the chamber, the discharge end of said working chamber being provided with moulding and cutting means whereby the substance being treated is discharged from the apparatus in predetermined shape and cut to a predetermined size.

12. Apparatus for manufacturing butter in a continuous operation from warm cream having a fat content equal to or more than the standard fat content of butter comprising a frame-work having slidably mounted thereon an extruder section and an associated working section, a pair of driven inter-engaging screws located within said extruder section, the un-engaged peripheries of each screw being in close proximity to the interior wall of the extruder section, means within each screw for uniformly circulating a cooling medium therethrough, a jacket surrounding the extruder section to receive a circulating cooling medium, rotary working elements disposed within the working section to receive the product extruded by the screws within the extruder section, a mould located adjacent the discharge end of the working section, a receiving platform adjacent the mould and adjustable cutting means positioned at the discharging end of the apparatus.

HAROLD KERR.
JOSEPH O'CONNELL.